(12) United States Patent
Thirumalai

(10) Patent No.: US 10,547,843 B1
(45) Date of Patent: Jan. 28, 2020

(54) PREFIX CODING METHOD FOR HIGH-THROUGHPUT ENTROPY CODER IN DISPLAY INTERFACE COMPRESSION

(71) Applicant: Samsung Display Co., Ltd., Yongin, Gyeonggi-Do (KR)

(72) Inventor: Vijayaraghavan Thirumalai, Fremont, CA (US)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/151,158

(22) Filed: Oct. 3, 2018

Related U.S. Application Data

(60) Provisional application No. 62/702,788, filed on Jul. 24, 2018.

(51) Int. Cl.
| | |
|---|---|
| H04N 19/13 | (2014.01) |
| H04N 19/176 | (2014.01) |
| H04N 19/132 | (2014.01) |
| H04N 19/103 | (2014.01) |

(52) U.S. Cl.
CPC .......... *H04N 19/13* (2014.11); *H04N 19/103* (2014.11); *H04N 19/132* (2014.11); *H04N 19/176* (2014.11)

(58) Field of Classification Search
CPC .... H04N 19/13; H04N 19/132; H04N 19/103; H04N 19/176
USPC .................................................... 375/240.02
See application file for complete search history.

(56) References Cited

U.S. PATENT DOCUMENTS

| | | | |
|---|---|---|---|
| 6,198,412 B1 | 3/2001 | Goyal | |
| 8,509,555 B2 | 8/2013 | Meany | |
| 8,947,271 B2 * | 2/2015 | Lynch | H03M 7/40 |
| | | | 341/106 |
| 9,877,048 B2 | 1/2018 | Thirumalai et al. | |
| 2018/0007359 A1 | 1/2018 | Hsiang | |
| 2018/0302651 A1 * | 10/2018 | Jacobson | H04N 19/65 |

OTHER PUBLICATIONS

Natan Jacobson, "A new display stream compression standard under development in VESA", Proc. SPIE 10396, Applications of Digital Image Processing XL, 103960U (Sep. 19, 2017); doi: 10.1117/12.2274595.

* cited by examiner

*Primary Examiner* — Shan E Elahi
(74) *Attorney, Agent, or Firm* — Innovation Counsel LLP

(57) ABSTRACT

A system and method of forming entropy coding groups in an entropy encoder includes providing multiple prefix codebooks, each prefix codebook being associated with a bit-based representation; receiving a block of sample values as a current block of sample values; forming multiple entropy coding groups; converting the sample values in each entropy coding group to a selected bit-based representation; determining the bit-based representation used for each respective entropy coding group; selecting a first or second prefix codebook for a respective entropy coding group in response to the determining; applying the selected prefix codebook to encode a prefix value of the respective entropy coding group; forming the bit-representation of the entropy coding groups, where the bit-representation of each entropy coding group includes a prefix encoded using the selected prefix codebook and one or more sample values; and providing the bit-representation of the entropy coding groups as an output.

20 Claims, 12 Drawing Sheets

FIG. 4(a)

| Prefix | Suffix 1 | Suffix 2 | Suffix 3 | Suffix 4 |

Entropy Coding Group

FIG. 4(b)

| 110 | 01 | 10 | 11 | 00 |

Unary Code of 2     Samples {1, -2, -1, 0}     Two's complement

FIG. 4(c)

| 110 | 01 | 10 | 00 | 1 | 0 | 0 |

Unary Code of 2     Samples {1, -2, -1, 0}     sign-magnitude

FIG. 4(d)

| Prefix | Suffix 1 | Suffix 2 | Suffix 3 | Suffix 4 | Prefix | Suffix 1 | Suffix 2 | Suffix 3 | Suffix 4 |

Group 1     Group 2

| Unary code | Prefix (bitsReq) (luma component) | Prefix (bitsReq) (chroma component) |
|---|---|---|
| 0 | 2 | 2 |
| 10 | 3 | 1 |
| 110 | 4 | 3 |
| 1110 | 5 | 4 |
| 11110 | 1 | 5 |
| 111110 | 6 | 6 |
| 1111110 | 7 | 7 |
| ... | ... | ... |

FIG. 9

| Sample | -1 | 13 | 1 | 6 | 4 |
|---|---|---|---|---|---|
| Bits (SM) | 1 | 4 | 1 | 3 | 4 |
| Bits (2C) | 1 | 5 | 3 | 4 | 5 |

FIG. 10

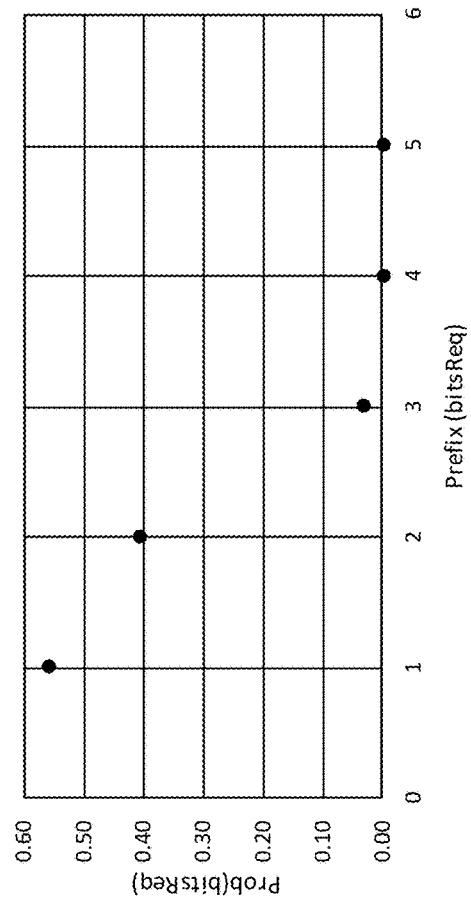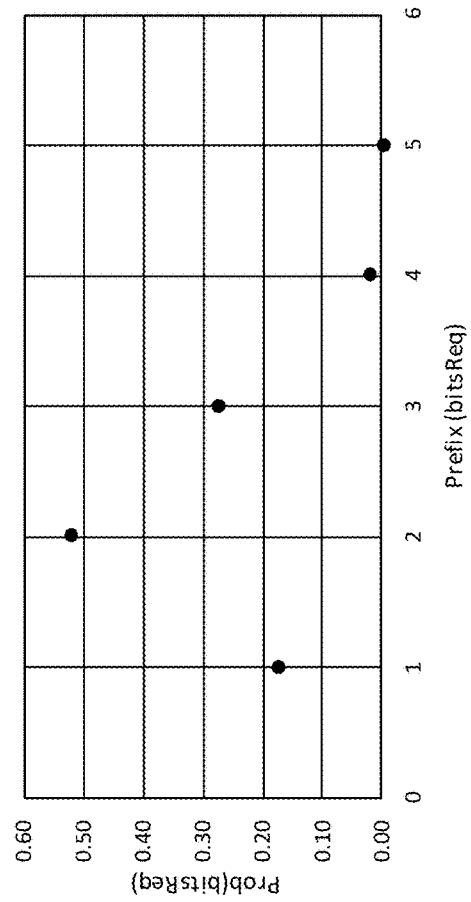
FIG. 11(a)
FIG. 11(b)
FIG. 11

2C Representation

| Prefix Code (Unary Code) | Prefix Value (luma component) | Prefix Value (chroma component) |
|---|---|---|
| 0 | 2 | 2 |
| 10 | 3 | 1 |
| 110 | 4 | 3 |
| 1110 | 5 | 4 |
| 11110 | 1 | 5 |
| 111110 | 6 | 6 |
| ... | ... | ... |

FIG. 12(b)

SM Representation

| Prefix Code (Unary Code) | Prefix Value (luma and chroma components) |
|---|---|
| 0 | 1 |
| 10 | 2 |
| 110 | 3 |
| 1110 | 4 |
| 11110 | 5 |
| 111110 | 6 |
| ... | ... |

PREFIX CODING METHOD FOR HIGH-THROUGHPUT ENTROPY CODER IN DISPLAY INTERFACE COMPRESSION

CROSS REFERENCE TO RELATED APPLICATIONS

This application claims priority to U.S. Provisional Patent Application No. 62/702,788, entitled SYSTEM AND METHODS OF PREFIX CODING FOR HIGH-THROUGHPUT ENTROPY CODER IN DISPLAY COMPRESSION, filed Jul. 24, 2018, which is incorporated herein by reference for all purposes.

FIELD OF THE DISCLOSURE

The present disclosure relates to a prefix coding method in a high-throughput entropy coder and, in particular, to a prefix coding method applying a selected prefix codebook to code the prefix of an entropy coding group to improve efficiency.

BACKGROUND OF THE DISCLOSURE

VESA (Video Electronics Standard Association) developed a new display interface compression standard for mobile or smartphone displays or hand-held devices called VESA Display Compression-Mobile or VDC-M. VDC-M targets higher compression ratio than Display Stream Compression (DSC) while maintaining visually lossless quality as of DSC at the cost of increased complexity. VDC-M has application in mobile devices that use a display link, such as the MIPI display serial interface (DSI).

In particular, the VDC-M compression standard is fixed rate codec (encoder-decoder) and supports compression rates down to 6 bits/pixel for a RGB 4:4:4 signal source with 8 bits per color component. VDC-M is a block based codec with a block size of 8×2 pixels. In operation, the VDC-M codec operates by applying or testing multiple coding modes for each block and selecting a best coding mode for a block based on a rate-distortion cost. A different coding mode may be selected for each block. With the selected coding mode, the data samples are encoded using an entropy encoder to generate a compressed bitstream. Substream multiplexing is implemented to enable parallel parsing of the compressed bitstream to achieve a high decoder throughput.

SUMMARY OF THE DISCLOSURE

The present disclosure discloses a system and method for forming entropy coding groups in an entropy encoder, substantially as shown in and/or described below, for example in connection with at least one of the figures, as set forth more completely in the claims.

These and other advantages, aspects and novel features of the present disclosure, as well as details of an illustrated embodiment thereof, will be more fully understood from the following description and drawings.

In one embodiment, a method of forming entropy coding groups in an entropy encoder includes providing multiple prefix codebooks, each prefix codebook being associated with a bit-based representation; receiving a block of a first number of sample values generated by a selected coding mode processing as a current block of sample values; forming multiple entropy coding groups by distributing the first number of sample values into the entropy coding groups; converting the sample values in each entropy coding group to a selected bit-based representation; determining the bit-based representation used for each respective entropy coding group; in response to the determining that a respective entropy coding group is encoded using a first bit-based representation, selecting a first prefix codebook from the plurality of prefix codebooks; in response to the determining that the respective entropy coding group is encoded using a second bit-based representation, selecting a second prefix codebook from the plurality of prefix codebooks, the second prefix codebook being different from the first prefix codebook; applying the selected prefix codebook to encode a prefix value of the respective entropy coding group; forming the bit-representation of each respective entropy coding group, where the bit-representation of each respective entropy coding group comprises a prefix encoded using the selected prefix codebook and one or more sample values encoded in the selected bit-based representation; and providing the bit-representation of the entropy coding groups as an output.

In another embodiment, a system for forming entropy coding groups in an entropy encoder includes a processor; and a memory coupled with the processor, wherein the memory is configured to provide the processor with instructions which when executed cause the processor to: provide multiple prefix codebooks, each prefix codebook being associated with a bit-based representation; receive a block of a first number of sample values generated by a selected coding mode processing as a current block of sample values; form multiple entropy coding groups by distributing the first number of sample values into the entropy coding groups; convert the sample values in each entropy coding group to a selected bit-based representation; determine the bit-based representation used for each respective entropy coding group; in response to the determining that a respective entropy coding group is encoded using a first bit-based representation, select a first prefix codebook from the plurality of prefix codebooks; in response to the determining that the respective entropy coding group is encoded using a second bit-based representation, select a second prefix codebook from the plurality of prefix codebooks, the second prefix codebook being different from the first prefix codebook; apply the selected prefix codebook to encode a prefix value of the respective entropy coding group; form the bit-representation of each respective entropy coding group, where the bit-representation of each respective entropy coding group comprises a prefix encoded using the selected prefix codebook and one or more sample values encoded in the selected bit-based representation; and provide the bit-representation of the entropy coding groups as an output.

In yet another embodiment, a method of decoding a compress bit stream, the method includes receiving a compressed bitstream that has been encoded in an entropy encoder using multiple prefix codebooks to encode a prefix of each entropy coding group in the compressed bitstream; processing a current block of samples values in the received compressed bitstream; determining the bit-based representation used for each entropy coding group in the current block of sample values; selecting a prefix codebook from the plurality of prefix codebooks based on the determined bit-based representation; decoding the current block using the selected prefix codebook; and generating sample values for each component of the current block as an output.

BRIEF DESCRIPTION OF THE DRAWINGS

Various embodiments of the present disclosure are disclosed in the following detailed description and the accompanying drawings.

FIG. 4, which includes FIGS. 4(*a*) to 4(*d*), illustrates entropy coding group structure and the output of the common prefix entropy code (CPEC) in some examples.

FIG. 5, which includes FIGS. 5(*a*) and 5(*b*), illustrates an exemplary grouping method used to form entropy coding groups for one component in a block of sample values in some examples.

FIG. 6, which includes FIGS. 6(*a*) and 6(*b*), illustrates an exemplary grouping method used to form entropy coding groups for one component in a block of 8 sample values in some examples.

FIG. 9 illustrates a prefix codebook in some examples.

FIG. 10 illustrates an example entropy coding group in sign-magnitude and two's complement representation.

FIG. 11, which includes FIGS. 11(*a*) and 11(*b*), illustrates the probability mass function (pmf) for the sign-magnitude and two's complement representations in some examples.

FIG. 12, which includes FIGS. 12(*a*) and 12(*b*), illustrates prefix codebooks for different bit-based representations which can be implemented in the prefix coding method in embodiments of the present disclosure.

DETAILED DESCRIPTION

According to embodiments of the present disclosure, a display interface codec performing video signal compression using one or more coding modes to encode a block of pixel values includes an entropy coder that implements a prefix coding method to improve the throughput of the decoding operation. In some embodiments, the display interface codec includes a display stream encoder implementing the prefix coding method to select a prefix codebook to encode the prefix of an entropy coding group based on the bit-based representation used to code the sample values in the entropy coding group. The prefix coding method can be applied to entropy coding groups generated using any of the coding modes implemented in the entropy coder. In some examples, the sample values of the entropy coding groups are coded using bit-based representations including two's complement (2C) and sign-magnitude (SM). The prefix coding method provides a first prefix codebook for the sign-magnitude representation and a second prefix codebook for the two's component representation.

In embodiments of the present disclosure, the display interface codec includes a display stream decoder which implements the prefix coding method to decode the prefix. In particular, the display stream decoder receives a compressed bitstream generated using the prefix coding method at the encoder. The decoder determines the prefix codebook used for the prefix of each entropy coding group. The decoder then decodes each block based on the selected prefix codebook used by the display stream encoder.

Figure 1:
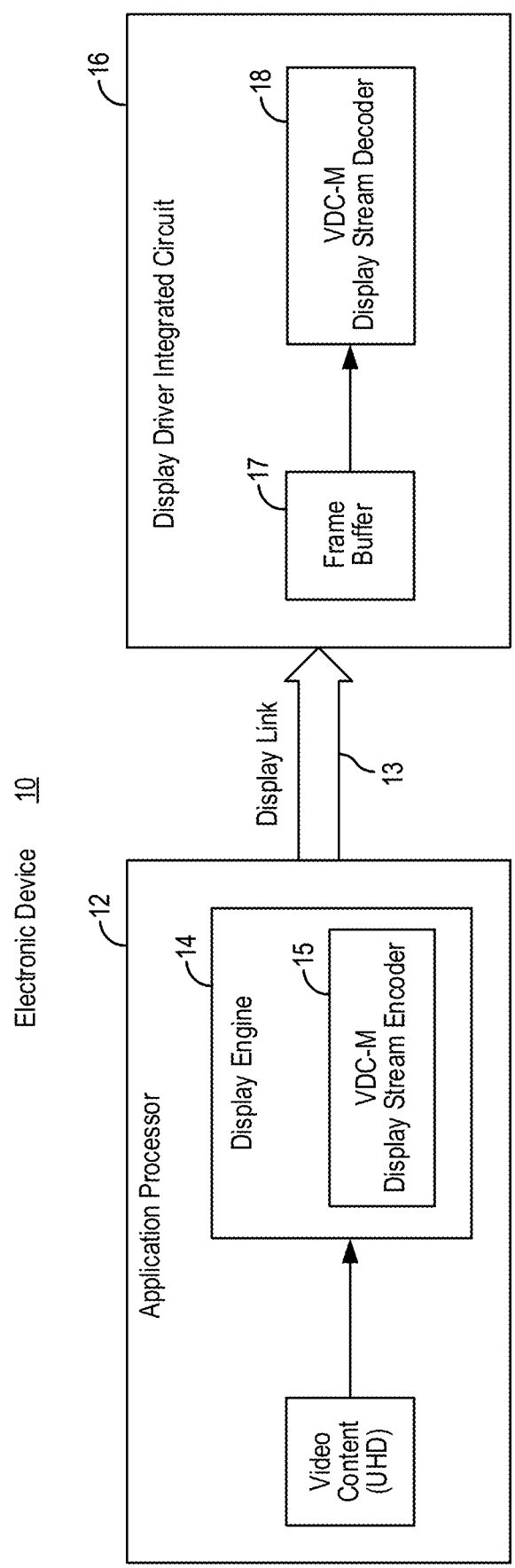
FIG. 1 is a schematic diagram illustrating a system configuration for implementing the display interface codec in some examples.

In embodiments of the present disclosure, the display interface codec performs video signal compression based on the display interface compression standard for mobile or smartphone displays called VESA Display Compression Mobile (or VDC-M). The VDC-M display interface compression standard is described in Jacobson et al., "A new display stream compression standard under development in VESA," Proc. SPIE 10396, Applications of Digital Image Processing XL, 103960U (19 Sep. 2017). In particular, VDC-M is fixed rate codec (encoder-decoder) and supports compression rates down to 6 bits/pixel for a RGB 4:4:4 source. FIG. 1 is a schematic diagram illustrating a system configuration for implementing the display interface codec in some examples. Referring to FIG. 1, an electronic device 10 includes an application processor 12 communicating with a display driver integrated circuit 16 over a display link 13. The application processor 12 includes a display engine 14 which receives video content and implements a display stream encoder 15, such as a display stream encoder based on VDC-M display interface compression standard. The encoded bitstream is transmitted from the encoder 15 over the display link 13 to the display driver integrated circuit 16. The display link 13 may be a physical link or a wireless link. The display driver integrated circuit 16 includes a frame buffer 17 for storing the incoming bitstream and providing the received bitstream to a display stream decoder 18, such as a display stream decoder based on VDC-M display interface compression standard.

In some embodiments, the display stream encoder and the display stream decoder are both implemented as hardware components, such as semiconductor integrated circuits. In some embodiments, the display stream encoder and the display stream decoder are implemented as application specific integrated circuits (ASICs). In other embodiments, the display stream decoder is implemented in hardware while the display stream encoder is implemented in software or firmware in the application processor on the host system.

Figure 2:
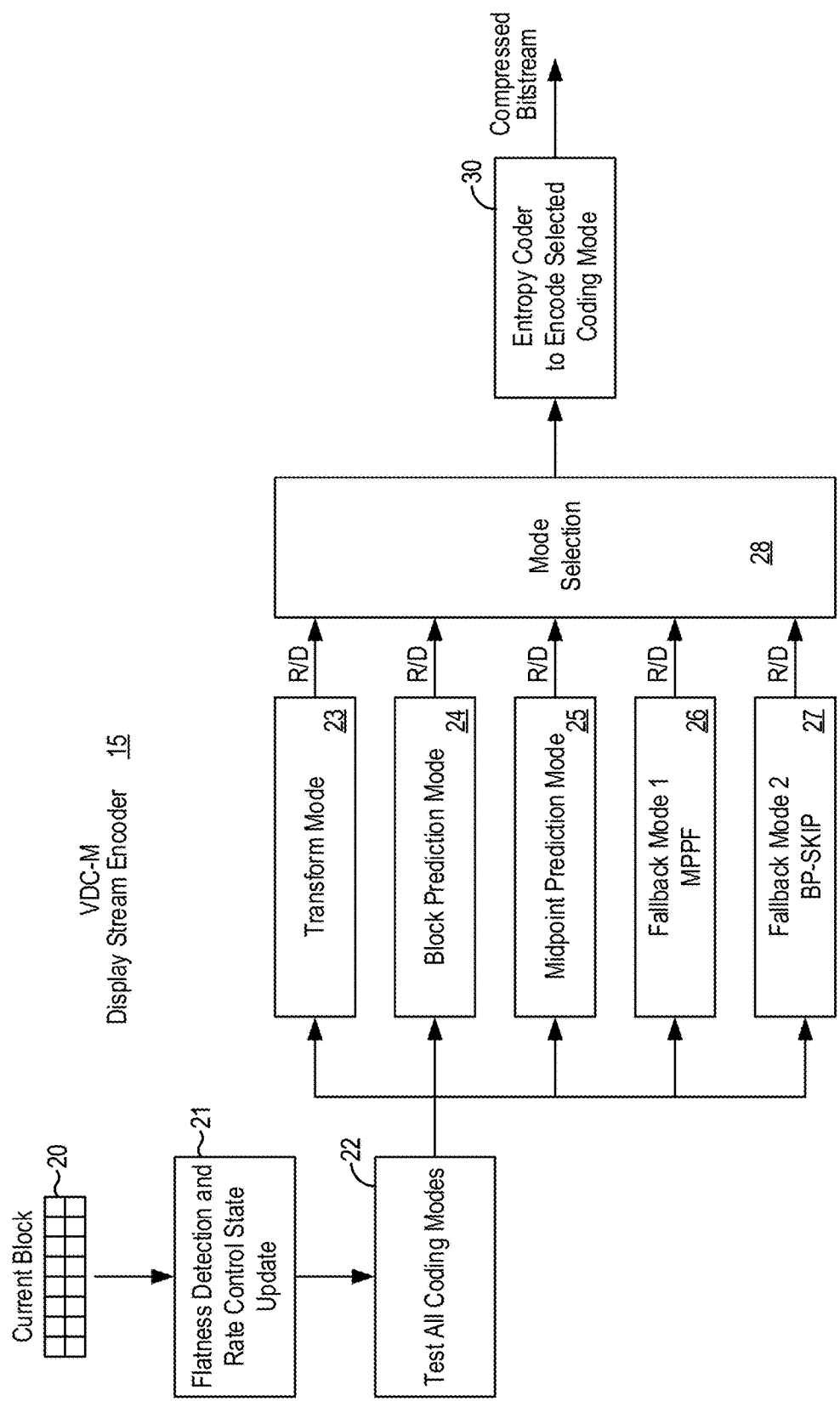
FIG. 2 is a process diagram illustrating the operation of the display stream encoder in some examples.

FIG. 2 is a process diagram illustrating the operation of the display stream encoder in some examples. The VDC-M display interface compression standard is a block based codec with a block size of 8×2 pixels. Accordingly, the display stream encoder 15 operates on the video data in blocks of 8×2 pixels, for example, in 8 columns and 2 rows. Referring to FIG. 2, the display stream encoder 15 receives pixel values for a current block of 8×2 pixels (20). Each block of pixels includes pixel values for one or more color components. For example, each block of pixels typically includes pixel values for three color components. The encoder 15 performs flatness detection and updates the rate control state update (21). The encoder 15 then tests the full set of coding modes in parallel on the pixel values for the current block of pixels (22). In the present example, the coding modes 23-27 are applied. For each coding mode, the encoder 15 determines a rate R of the mode, being the total of all syntax bits required by the mode, and a distortion D. The encoder 15 determines the RD cost for each coding mode. The encoder 15 selects the coding mode with the smallest RD cost (28) subject to rate control constraints. The encoder 15 then encodes the selected coding mode using an entropy coder (30). The entropy encoder generates a compressed bitstream which can be transmitted onto the display link. The display stream encoder 15 then move onto the next block of pixels. In operation, a different coding mode may be selected for each block of pixels in a frame of video content.

In the present description, "component" or "color components" refers to the color component used to represent the video signal, which can be RGB or YCbCr or YUV.

Each coding mode in the display stream encoder 15 has properties which are tailored to specific type of video content. In the present example, the display stream encoder 15 implements the following coding modes:

(1) Transform mode (23)—the transform mode is useful for capturing natural contents in the input video source. An example of the transform mode is the discrete cosine transform.

(2) Block prediction (BP) mode (24)—the block prediction mode is useful for capturing graphic and textured contents in the input video source.

(3) Midpoint prediction (MPP) mode (25)—the midpoint prediction mode is useful in capturing uncorrelated noise contents in the input video source.

(4) Fallback Modes (26, 27)—one or more fallback modes are provided to guarantee fixed-rate compression when other modes are not affordable. In the present example, a midpoint prediction fallback (MPPF) mode (26) and a block prediction skip (BP-Skip) mode (27) are provided.

Entropy Coder

Figure 3:
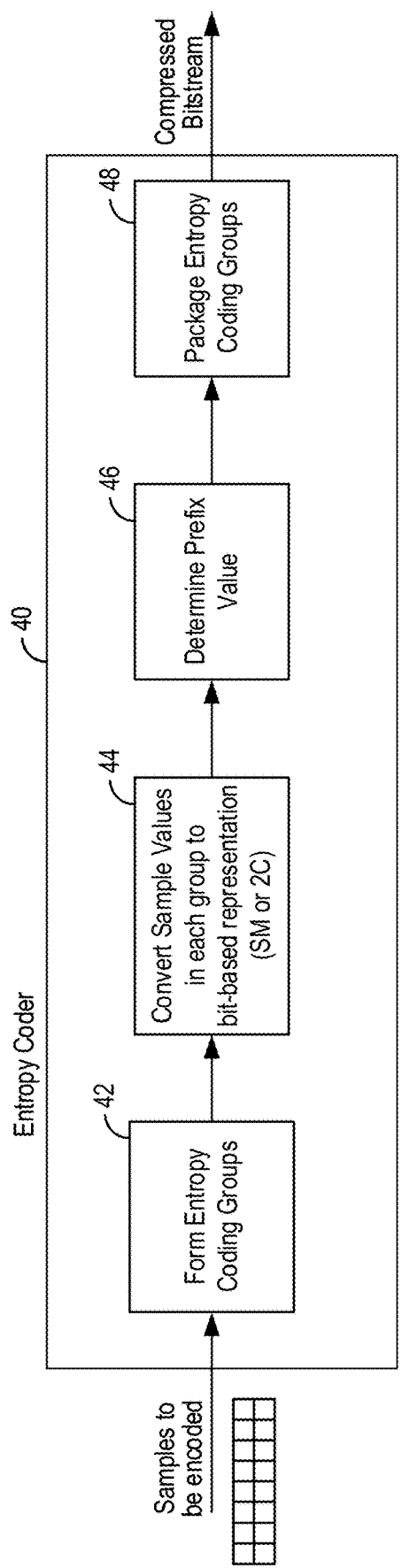
FIG. 3 is a process diagram illustrating the operation of an entropy coder in some examples.

Referring still to FIG. 2, with the coding mode selected, the display stream encoder 15 encodes the samples using the entropy coder (30). The operation of the entropy coder will now be described. FIG. 3 is a process diagram illustrating the operation of an entropy coder in some examples. The entropy coder is designed to facilitate high-throughput at the decoder by dividing the samples in each color component of a block into separate groups. Referring to FIG. 3, the entropy coder 40 receives the current block of sixteen data values per color component generated by the selected coding mode. In the present description, the data values of the current block for each color component are also referred to as samples or sample values and the entropy coder can be described as receiving a block of sixteen samples for each color component. For each block of data values associated with a respective color component, the entropy coder 40 performs grouping of one or more samples into an entropy coding group (ECG) (42). In particular, the samples in the current block for each component are distributed among a predetermined number of entropy coding groups. For example, for 4:4:4 video content, a block of 16 samples for a component may be distributed into four entropy coding groups. The entropy coder 40 then converts the sample values in each group to a predetermined bit-based representation (44). For example, the entropy coder 40 may convert each sample value into the two's complement representation. Alternately, the entropy coder 40 may convert each sample value into sign-magnitude representation.

The entropy coder 40 then determines the prefix value for each group of the block (46). More specifically, the prefix value represents the number of bits per sample required to code the sample values in an entropy coding group. In one example, each entropy coding group includes a variable length prefix and N fixed-length suffixes being the sample values. The prefix value is the number of bits required to represent each sample value, or each suffix, in the bit-based representation. With the prefix and the suffixes thus formed for each group, the entropy coder 40 packages the entropy coding groups into a compressed bitstream to be transmitted (48). In this manner, the encoded data for each color component of the video content will be transmitted in the compressed bitstream as a set of entropy coding groups.

The data values being coded by the entropy coder are a function of the coding mode selected. In one example, when the transform coding mode is selected, the entropy coder encodes the quantized transform coefficients. That is, the data values are the quantized transform coefficients. In another example, when the block prediction mode is selected, the entropy coder encodes the quantized prediction residuals.

In the above description, the video content is assumed to be a 4:4:4 video content. In that case, there are 16 samples per block for each color component. For example, for RGB video signals, each R, G and B color component includes 16 samples per block. In other examples, the video content may be a 4:2:2 video content. For the 4:2:2 video content, the luma component contains a block of 16 samples and the two chroma components contain only 8 samples or 4×2 block size. In yet another example, the video content may be a 4:2:0 video content. For the 4:2:0 video content, the luma component contains a block of 16 samples and the two chroma components contain only 4 samples or 2×2 block size.

The entropy coder receives 16 samples for each color component in a current block of data values and divides the samples into entropy coding groups. The sample values in each entropy coding group are then encoded into bit-based representation. In the present description, the entropy coding groups are converted to bit-based representation using common prefix entropy code (CPEC). FIG. 4, which includes FIGS. 4(*a*) to 4(*d*), illustrates entropy coding group structure and the output of the common prefix entropy code (CPEC) in some examples. Referring to FIG. 4(*a*), the entropy coder divided the samples into entropy coding groups where each entropy coding group consists of a variable-length prefix and one or more fixed-length suffixes. In the example shown in FIG. 4(*a*), the entropy coding group includes four suffixes associated with four samples of the block.

For each entropy coding group, CPEC is applied to convert the sample values into bit-based representation. In particular, an entropy coding group with a group size of N or N samples includes a variable-length prefix followed by N fixed-length suffixes, N being an integer greater than 0. Using CPEC, the prefix is coded using a variable length code, e.g., unary code, and represents the number of bits used to code each suffix. The actual sample value within the group is represented in the suffix, one suffix for each sample within the group. All N suffixes within the group are allocated the same number of bits, i.e., fixed length code. For example, the samples can be represented in two's complement or sign-magnitude representation. In particular, each suffix in an entropy coding group using CPEC corresponds to one sample value encoded in the given bit-based representation.

FIG. 4(*b*) illustrates an example CPEC output for an entropy coding group with 4 samples having sample values {1, −2, −1, 0}. In this example, two's complement representation is used to generate the bits for the sample values in the entropy coding group. The number of bits required for a faithful reconstruction of this group is 2. In particular, in two's complement representation, n bits are required to represent data in the range $[-2^{(n-1)}, 2^{(n-1)}-1]$. In the example of FIG. 4(*b*), each sample value is represented by 2 bits in two's complement representation. Therefore, the prefix will signal the value of 2. For the group of sample values {1, −2, −1, 0}, the bits outputted by the CPEC operation would be a prefix of 110 (unary code of 2) and four suffixes where each sample is coded using 2 bits, such as "01 10 11 00", as shown in FIG. 4(b). The output of the CPEC operation in the example of FIG. 4(b) is illustrative only and the actual output of the CPEC operation might be different depending on the actual implementation.

The example shown in FIG. 4(b) uses the two's complement representation. Other representation such as sign-magnitude can be also used in the CPEC operation to generate the bits for each entropy coding group. When sign-magnitude representation is used, n bits are required for each sample, where the absolute value (i.e., magnitude) of all the samples in the group are in the data range of $[0, 2^n-1]$. In the sign-magnitude representation, the sign bit is signaled only for the non-zero values. An example of the output of CPEC operation using the sign-magnitude representation is shown in FIG. 4(c). For the input group of sample value {1, −2, −1, 0}, the output of CPEC operation in sign-magnitude representation would be a prefix of 110 (unary code of 2), followed by suffixes that codes the absolute value of each sample using 2 bits, such as 01 10 01 00, and at last the sign bits 1 0 0, assuming 1 for positive symbol and 0 for negative symbol. Note that the sign value of last symbol 0 is not signaled.

When all the samples in a group have zero values, only one bit is signaled for the entire group, which is referred as "group skip" in the present disclosure. Group skip is applicable for CPEC that uses sign-magnitude and two's complement representation.

As thus constructed, the entropy encoder divides the samples of each components of a block to generate a set of entropy coding groups which are then transmitted in the compressed bitstream. At the entropy decoder, the variable length prefix of the current group is parsed and the remaining number of suffix bits in the current group is then known. Therefore, the entropy decoder can jump and start parsing the prefix of the next group, while the decoder decodes the suffixes of the previous group, as shown in FIG. 4(d). Due to the limited number of variable length codes (at most 4 for one color component in a block of size 8×2), the decoder can achieve high throughput.

The entropy coder determines the grouping of samples into entropy coding groups for each component in a block of samples. The size of each ECG, that is, the number of samples to be included in each ECG, will depend on the coding mode, the color component and the chroma sampling format. The distribution of samples within the entropy coding groups is also dependent on the coding mode.

Figures 5, 5A, 5B, 6, 6A, 6B:
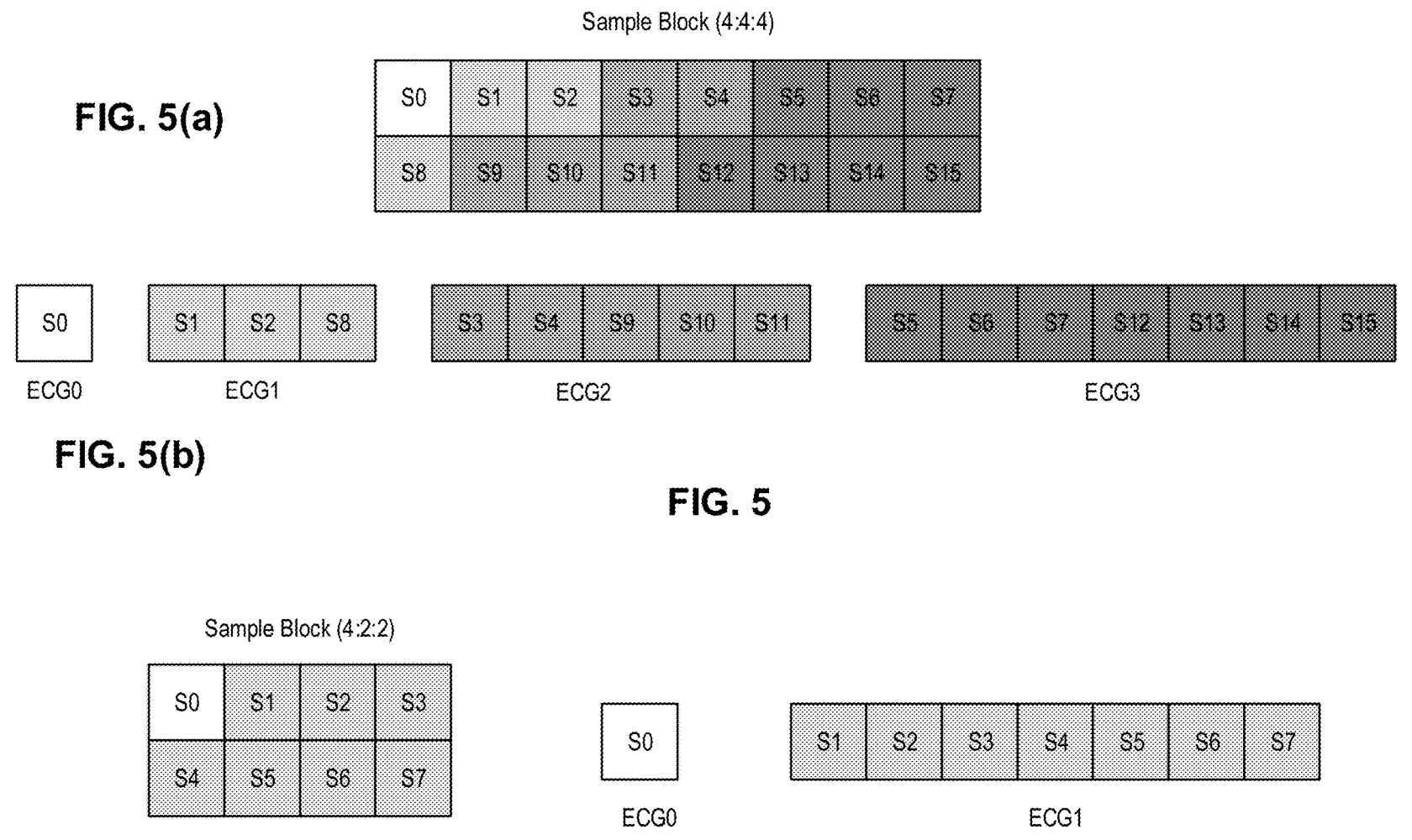

FIG. 5, which includes FIGS. 5(a) and 5(b), illustrates an exemplary grouping method used to form entropy coding groups for one component in a block of sample values in some examples. Referring to FIG. 5(a), each block of sample values for one component contains 8×2 or 16 samples S0 to S15. In the present example, the entropy coder distributes the 16 samples into four entropy coding groups ECG0 to ECG3, where each group is coded using the CPEC structure, as shown in FIG. 5(b). In the present example, a non-uniform grouping method is used where the size or number of samples for each entropy coding group is not the same. For instance, the non-uniform sample distribution is used for the transform mode so that samples with similar frequency in the transform domain are grouped together. Referring to FIG. 5(b), the grouping method forms entropy coding groups of size 1, 3, 5 and 7. The DC value S0 is considered as a separate group ECG0. The group ECG1 contains three samples S1, S2 and S8. The group ECG2 contains five samples S3, S4, S9, S10 and S11. The group ECG3 contains seven samples S5, S6, S7, S12, S13, S14 and S15. In particular, the samples assigned to each group may be selected in a zig-zag pattern within the 8×2 block.

In the case of 4:4:4 video content, each color component (e.g. RGB) contains the same number of samples—that is, 16 samples per block. Therefore, the grouping method in FIG. 5 may be used for all of the color components. In the case of 4:2:2 video content, the luma component contains the block of 16 samples and so the grouping method in FIG. 5 may be used. However, the chroma components contain only 8 samples or 4×2 block size. In that case, a different grouping method is applied. FIG. 6, which includes FIGS. 6(a) and 6(b), illustrates an exemplary grouping method used to form entropy coding groups for one component in a block of 8 sample values in some examples. Referring to FIG. 6(a), for 4:2:2 video content, the chroma components are represented by a block size of 4×2 or 8 samples. In that case, the grouping method may form two entropy coding groups ECG0 and ECG1 with 1 and 7 samples respectively, as shown in FIG. 6(b).

The non-uniform sample distribution described above is advantageous for use with the transform coding mode so that samples with similar frequency in the transform domain are grouped together. In the case of the block prediction mode, a uniform grouping method is used where each entropy coding group contains the same number of quantized residual samples. For example, the grouping method may put 4 samples per group for a 8×2 block of sample values per component. In one example, the first group ECG0 may contain the following samples: ECG 0: {S0, S1, S8, S9}. The second group ECG1 may contain the following samples: ECG 1: {S2, S3, S10, S11}, and so on.

Figures 7, 7A, 7B:
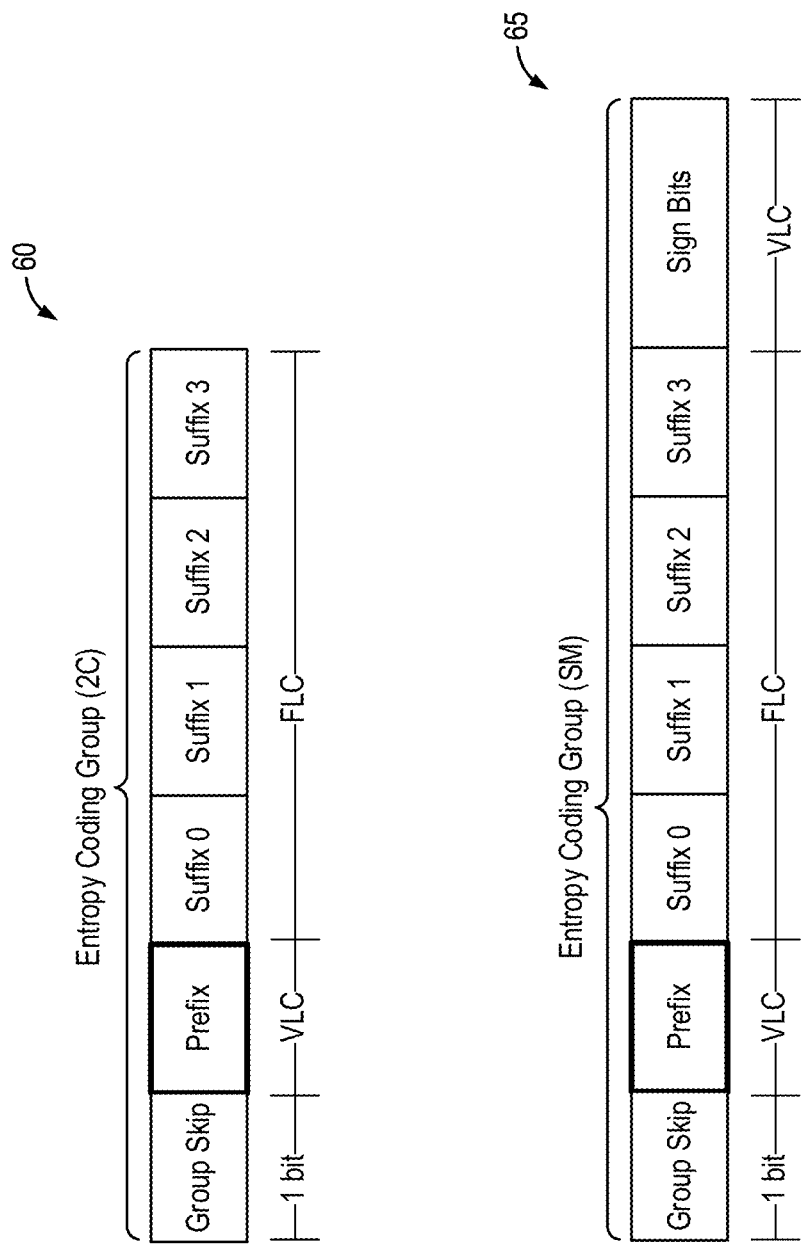
FIG. 7, which includes FIGS. 7(*a*) and 7(*b*), illustrates entropy coding group structure using the two's complement and sign-magnitude bit-based representation in some examples.

With the samples of a given block distributed into entropy coding groups, the sample values in each entropy coding group are converted to a given bit-based representation. Common prefix entropy code (CPEC) is applied to the entropy coding groups to form the prefix, suffix and sign bits (where applicable) for each group. FIG. 7, which includes FIGS. 7(a) and 7(b), illustrates entropy coding group structure using the two's complement and sign-magnitude bit-based representation in some examples. FIG. 7(a) illustrates an entropy coding group 60 encoded using two's complement (2C) representation. Referring to FIG. 7(a), the entropy coding group 60 includes one bit for signaling Group Skip. As described above, when all the sample values (suffixes) are zero, the Group Skip bit is signaled so that the decoder can skip parsing the remainder portion of the group. The entropy coding group 60 then includes the prefix which is a variable length code and one or more suffixes forming a fixed length code. In the present example, the entropy coding group 60 includes four suffixes: Suffix 0, Suffix 1, Suffix 2, and Suffix 3. Each suffix in the group has the same number of bits, that is, each suffix in the group is represented by n bits. The prefix signals the number of bits used to represent each suffix. Therefore, the prefix signals the value of n.

FIG. 7(b) illustrates an entropy coding group 65 encoded using sign-magnitude (SM) representation. Common prefix entropy code (CPEC) is applied to the entropy coding group 65 to form the prefix, suffix and sign bits for the group. Referring to FIG. 7(b), the entropy coding group includes one bit for signaling Group Skip. The entropy coding group 60 then includes the prefix which is a variable length code and one or more suffixes forming a fixed length code. In the present example, the entropy coding group 65 includes four suffixes: Suffix 0, Suffix 1, Suffix 2, and Suffix 3. In the sign-magnitude representation, each suffix codes the absolute value of the respective sample value. Each suffix in the group has the n number of bits and the prefix signals the value of n. The entropy coding group 65 then includes the sign bits which is a variable length code. In the sign-magnitude representation, the sign bit is signaled only for the non-zero values.

As described above, the entropy encoder divides the samples of each component of a block to generate a set of entropy coding groups and the sample values in each entropy coding group are then converted to a selected bit-based representation. For each block of samples, different bit-based representation can be selected for each group. In some examples, both sign-magnitude (SM) and two's complement (2C) bit-based representations are used to code the entropy coding groups for a block of sample values.

Figure 8:
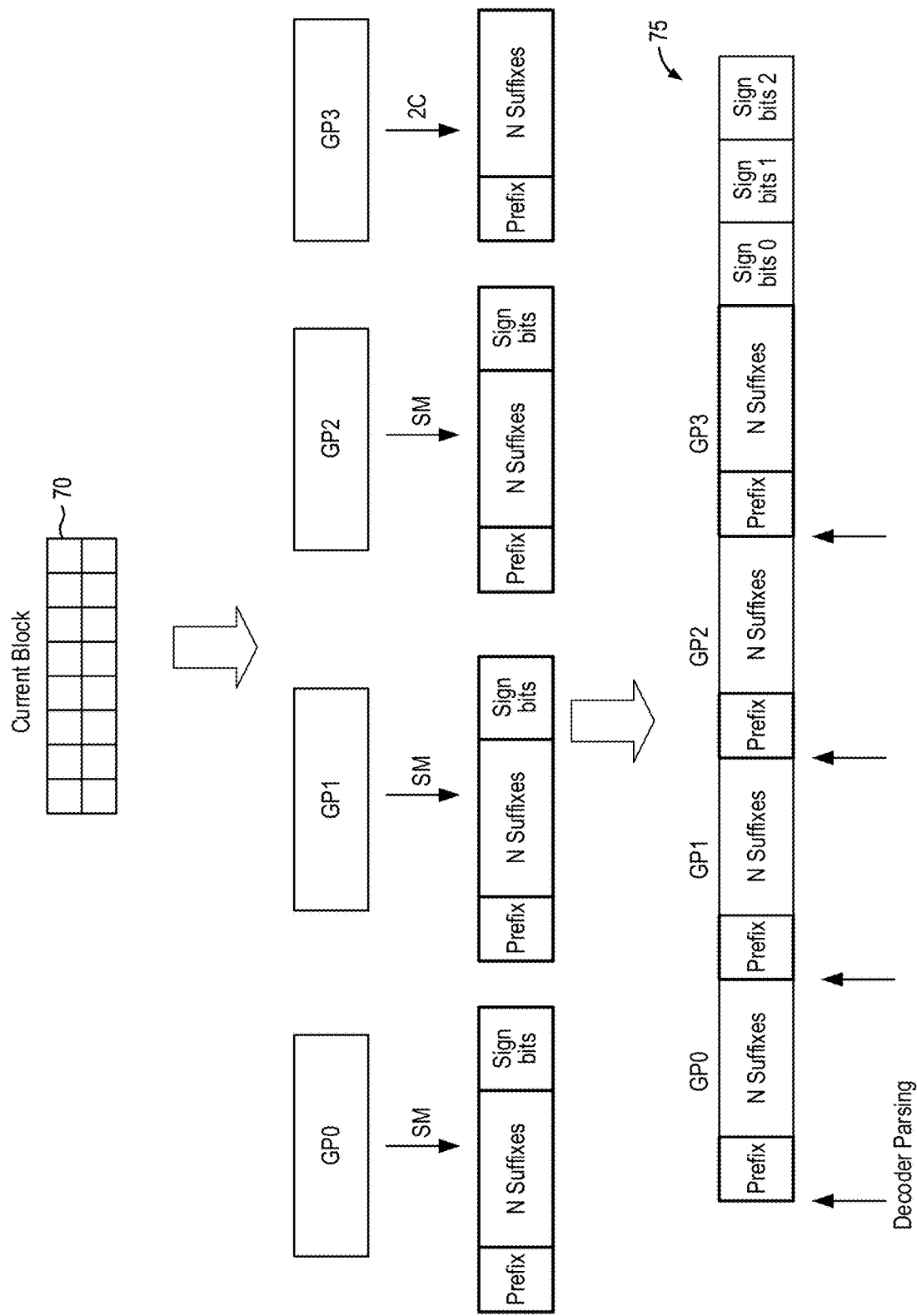
FIG. 8 illustrates the entropy coding groups for a block of samples in some examples.

FIG. 8 illustrates the entropy coding groups for a block of samples in some examples. Referring to FIG. 8, the samples in each component in a current block of samples 70 are distributed into two or more entropy coding groups. In the present example, the samples are distributed into four groups GP0, GP1, GP2 and GP3. In the present example, the first three entropy coding groups GP0 to GP2 are coded using sign-magnitude (SM) representation and the last group GP3 is coded using two's complement (2C) representation. In SM representation, the absolute value of each sample value are coded to form the suffix. Then, the corresponding sign bits are signaled only for sample values greater than zero. From the decoder standpoint, the bits corresponding to the absolute value of the sample values (suffixes) are parsed and decoded first, before parsing the sign bits. Therefore, in the sign-magnitude representation, there is a dependency between the parser and decoder logic that decodes the absolute value of the sample values.

In order to improve the decoder throughput, the last group GP3 is coded using two's complement representation. In two's complement (2C) representation, each sample value (including the sign) is coded directly in a suffix. As a result, there is no dependency between the parser and decoder logic.

FIG. 8 illustrates the entropy coding groups GP0 to GP3 packaged for transmission onto the bitstream. In practice, for each component in the current block, the entropy coding groups are packaged so that the prefix and suffixes of each group are placed first followed by the sign bits for the first three groups. That is, the sign bits for the three groups coded using sign-magnitude representation are placed at the end of the bit stream for each component of the block. Note that in FIG. 8, the Group Skip bit is omitted from the entropy coding groups to simplify the discussion. It is understood that the prefix of each entropy coding group is preceded by the Group Skip bit, as shown and explained in FIG. 7.

As thus constructed, each set of entropy coding groups include groups with sign-magnitude representation and at least one group with two-complement representation. As described above, each entropy coding group is preceded by the prefix which is coded using a variable length code, for example, the unary code. The prefix value corresponding to the minimum number of bits required for a faithful reconstruction of all symbols (or sample values) in a group. In the present example, the prefix value is sometimes referred to as "bitsReq". The number of bits required "bitsReq" to code each sample value is a function of the bit-based representation. That is, using sign-magnitude or two's complement representation may result in different prefix value and thus different number of bits in the prefix for each entropy coding group.

In the entropy coder, the prefix is coded into a variable length code using a prefix codebook. FIG. 9 illustrates a prefix codebook in some examples. The prefix codebook shown in FIG. 9 uses unary code to code the prefix value (bitsReq). In the present disclosure, a codebook refers to a dictionary that maps a symbol (or a value) to a binary code word. Due to the use of the Group Skip bit when all coefficients are zero, the case where the prefix value is 0 is not shown in the codebook. For prefix value equal to or greater than 6, the binary code word based on unary code is (bitsReq−1) number of 1's followed by a 0. The example prefix codebook shown in FIG. 9 provides a different codebook for the different components (luma and chroma) of the pixel values. Accordingly, for a prefix value of 4 of the luma component, the unary code for the prefix is "110". Meanwhile, for a prefix value of 4 for the chroma component, the unary code for the prefix is "1110".

In the conventional entropy coder, the same codebook is used regardless of the bit-based representation used for the suffixes. For example, both two's complement representation and sign-magnitude representation use the same unary coding codebook in FIG. 9 to code the prefix value. However, this is not an optimal solution due to the different ranges of data values in two's complement and sign-magnitude representations. In particular, the range for two's complement and the range for sign-magnitude are given as:

$$\text{range}_{2C}(n \text{ bits}) = [-2^{n-1}, 2^{n-1}-1]$$

$$\text{range}_{SM}(n \text{ bits}) = [0, 2^{n-1}-1]$$

Note that in two's complement representation, more samples can be represented for a given n bits. In particular, negative samples can be represented for a given n bits.

FIG. 10 illustrates an example entropy coding group in sign-magnitude and two's complement representations. Referring to FIG. 10, an entropy coding group includes four samples whose values are [−1, 13, 1, 6]. The prefix value (bitsReq) for the sign-magnitude representation is 4—that is, 4 bits are required to code the sample values [−1, 13, 1, 6] using sign-magnitude representation. Meanwhile, the prefix value (bitsReq) for the two's complement representation is 5—that is, 5 bits are required to code the sample values [−1, 13, 1, 6] using two's complement representation.

As a result, within the same entropy coding group, the calculated prefix values in two's complement and sign-magnitude representations are different. Accordingly, the same codebook cannot be used for two's complement and sign-magnitude representations to realize optimal performance.

In embodiments of the present disclosure, an entropy coding method in a display interface codec implements a prefix coding method to select a prefix codebook from multiple prefix codebooks based on the bit-based representation used to code the suffixes or samples in the entropy coding group, where one prefix codebook is provided for each bit-based representation. Each prefix codebook implements a given coding scheme and a given assignment of code words to prefix values. Furthermore, in some embodiments, a prefix codebook for a given representation may provide different code word assignments for different components of the pixel value. In some examples, a first prefix codebook is provided for the sign-magnitude representation and a second prefix codebook is provided for the two-complement representation. Accordingly, the prefix value associated with different bit-based representations may be coded using different prefix codebook. In this manner, the coding of the prefix value can be optimized for each bit-based representation, leading to improved performance for the display interface codec. In contrast, the conventional entropy coding scheme uses the same prefix codebook regardless of the bit-based representation used to code the sample values which leads to sub-optimal performance.

In embodiments of the present disclosure, each prefix codebook may be designed using one or more of the following coding schemes: unary code, Huffman code, Exponential-Golomb codes, Golomb-Rice codes or a combination of Golomb-Rice and Exp-Golomb codes. Each prefix codebook may use a different coding scheme. For example, the first codebook can use unary code and the second codebook can use Huffman code.

In the case where the same coding scheme is used for all of the prefix codebooks, for example, all the codebooks use unary code, the mapping of the code words in the codebooks may be different. That is, the same prefix value may be assigned or mapped to different unary codes in different prefix codebooks.

Furthermore, for a given representation, a different prefix codebook may be provided for each component of the pixel values. That is, the coding scheme and/or the code word assignment may be the same or different for each component of the pixel values. In some embodiments, different color components may use different coding schemes. For example, the R component in an RGB pixel data may use unary code while the G component may use the Huffman code. When the same coding scheme is used, each component may have its own code word assignment. That is, the same prefix values may be assigned to different unary codes for each of the components.

For a given sample value in a group, due to range difference in the sign-magnitude and two's complement representations, the prefix value may not be the same. The difference in prefix values as a function of the bit-based representation of the samples implies that the probability mass function (pmf) between the two representations are different. FIG. 11, which includes FIGS. 11(*a*) and 11(*b*), illustrates the probability mass function (pmf) for the sign-magnitude and two's complement representations in some examples. The pmf is drawn with the prefix value (bitsReq) in 'x' axis and the probability value of the given prefix value denoted as prob(bitsReq) in 'y' axis. Referring to FIG. 11(*a*), for the sign-magnitude representation, the prefix value 1 has the highest probability of occurrence followed by the prefix value of 2. Referring to FIG. 11(*b*), for the two's complement representation, the prefix value 2 has the highest probability of occurrence followed by the prefix value of 3.

In embodiments of the present disclosure, the prefix codebook is constructed using information from the underlying probability mass function (pmf) associated with the bit-based representation so that the most probable prefix value is assigned with the shorter code word (or code word with shorter bit length). In one embodiment, the prefix codebook is constructed so that the prefix values in decreasing probability of occurrence are assigned to code word in increasing number of bits. Accordingly, the prefix value with the highest probability of occurrence will be assigned the shortest code word while the prefix value with the lowest probability of occurrence will be assigned the longest code word. In other embodiments, the prefix codebook can be constructed using a probability to code word length relationship in general but the mapping is not limited to a linear relationship between the prefix value and the code word length. That is, several prefix values with high probability of occurrence may be assigned to code words with shorter bit length while several prefix values with low probability of occurrence may be assigned to code words with longer bit length. The prefix value with the highest probability may not be assigned the shorted code word but will be assigned to one of the several shorter code words.

FIG. 12, which includes FIGS. 12(*a*) and 12(*b*), illustrates prefix codebooks for different bit-based representations which can be implemented in the prefix coding method in embodiments of the present disclosure. Referring to FIG. 12, a first prefix codebook 80 (FIG. 12(*a*)) is provided for the sign-magnitude representation and a second prefix codebook 90 (FIG. 12(*b*)) is provided for the two's complement representation. In the present example, both prefix codebooks are constructed using the same coding scheme—the unary code. However, the prefix value to code word assignments in each prefix codebook are arranged specifically for the bit-based representation based on the probability mass function associated with the bit-based representation so that the more probable prefix values are assigned code words with shorter bit length.

Referring to FIG. 12(*a*), the prefix codebook 80 uses the unary code as the coding scheme. The prefix value of 0 is not included as the Group Skip bit is used to indicate a group with sample values that are all zeros. The prefix codebook 80 maps each prefix value (1 or greater) to a prefix code being as unary code based on the probability mass function of the prefix value in the sign-magnitude representation. For example, using the example probability mass function for the sign-magnitude representation in FIG. 11(*a*), the most probable prefix value for the sign-magnitude representation is 1 and the prefix codebook 80 assigns the shortest unary code 0 to the prefix value of 1. The next most probable prefix value for the sign-magnitude representation is 2 and the prefix codebook 80 assigns the next shortest unary code 10 to the prefix value of 2. The prefix codebook 80 is constructed so that the prefix values with decreasing probability of occurrence are assigned unary code words with increasing bit length. In the present example, for prefix value equal to or greater than 7, the binary code word based on unary code is (bitsReq−1) number of 1's followed by a 0. Furthermore, in the present example, the same prefix codebook is used for luma and chroma components in the sign-magnitude representation.

Referring to FIG. 12(*b*), the prefix codebook 90 uses the unary code as the coding scheme. The prefix value of 0 is not included as the Group Skip bit is used to indicate a group with sample values that are all zeros. The prefix codebook 90 maps each prefix value (1 or greater) to a prefix code being as unary code based on the probability mass function of the prefix value in the two's complement representation. Furthermore, in the present example, two different prefix codebooks 90A and 90B are provided for the luma and chroma components in the two's complement representation.

For example, using the example probability mass function for the two's complement representation in FIG. 11(*b*), the most probable prefix value for the two's complement representation is 2 and the prefix codebook 90 assigns the shortest unary code 0 to the prefix value of 2. The next most probable prefix value for the two's complement representation is 3 and the prefix codebook 90A assigns the next shortest unary code 10 to the prefix value of 3 while the prefix codebook 90B assigns the next shortest unary code 110 to the prefix value of 3. The prefix codebook 90 is constructed so that the prefix values with decreasing probability of occurrence are assigned unary code words with increasing bit length. In the present example, for prefix value equal to or greater than 7, the binary code word based on unary code is (bitsReq−1) number of 1's followed by a 0.

For the prefix codebook 90 for the two's representation, different code word assignments are used for the luma and chroma components of the pixel values. For example, for the prefix value of 5 in the luma component, the prefix codebook 90A assigns the unary code word "1110". Meanwhile, for the prefix value of 5 in the chroma component, the prefix codebook 90B assigns the unary code word "11110".

By providing different prefix codebooks for the different bit-based representations, each prefix codebook can be optimized for the respective bit-based representation. In this manner, the display interface codec performance can be markedly improved. In particular, the prefix coding method of the present disclosure improves the compression performance without increasing the complexity, while maintaining the same throughput at the decoder.

The prefix coding method and prefix codebooks described above are illustrative only and not intended to be limiting. Other prefix codebooks can be used in other embodiments of the present disclosure. In the above described embodiments, the entropy coding grouping methods are applied to a block size of 8×2 or 4×2 pixels. In other embodiments, the prefix coding method can be applied to any block size and any grouping method forming any number of entropy coding groups for each component of a block. In some embodiments, the prefix coding method can be applied to any chroma sampling format, including 4:4:4, 4:2:2 and 4:2:0. The prefix coding method can also be applied to any coding mode that employs CPEC. For example, the prefix coding method can be applied only to the transform mode, or only to block prediction mode, or both the transform and block prediction mode.

Figure 13:
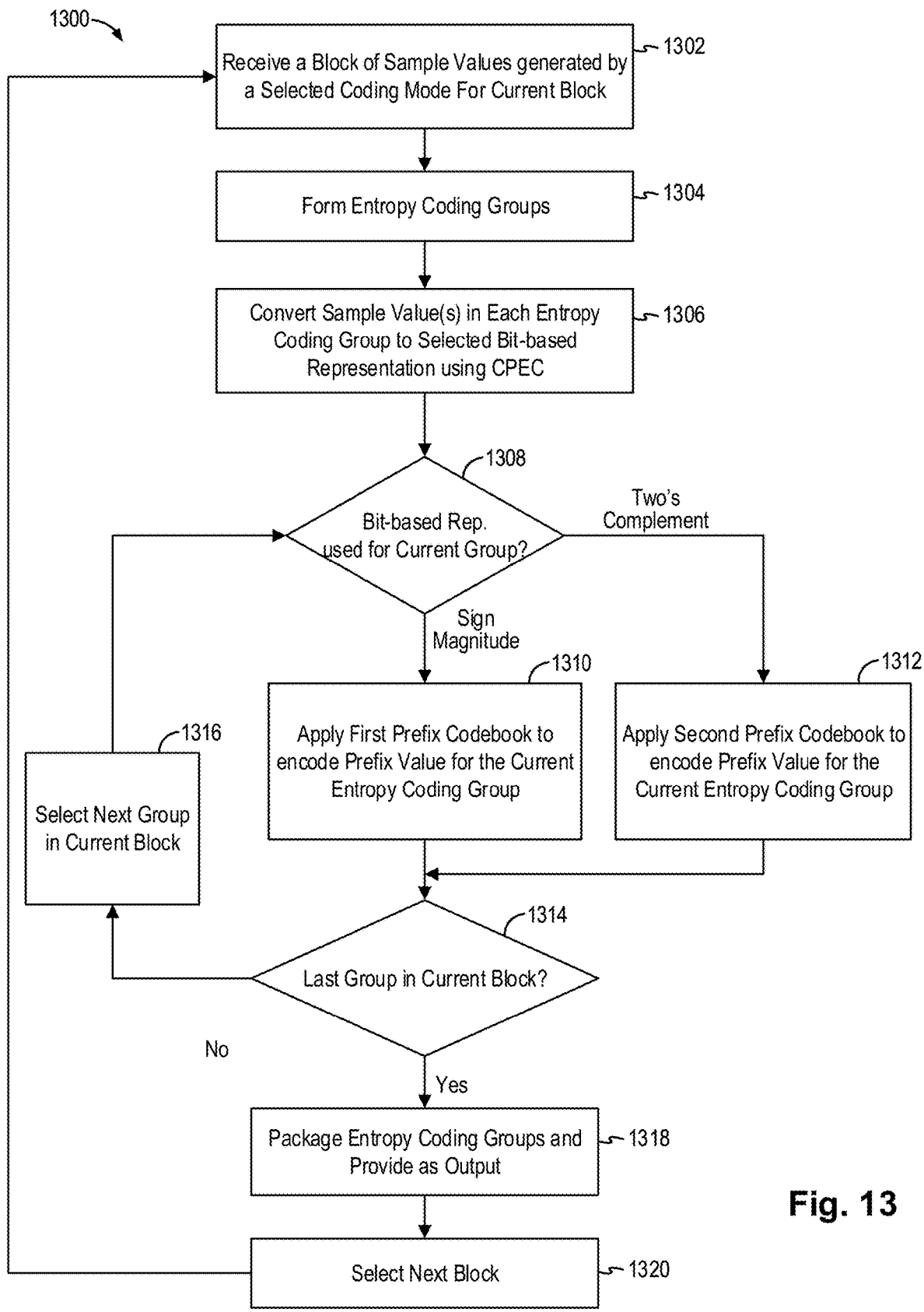
FIG. 13 is a flowchart illustrating an entropy coding method implemented in an entropy encoder in some embodiments.

FIG. 13 is a flowchart illustrating an entropy coding method implemented in an entropy encoder in some embodiments. The entropy coding method can be implemented in the entropy coder 30 in the display stream encoder of FIG. 2 in some embodiments. Based on the selected coding mode (e.g. transform mode, block prediction mode, etc.), a block of sample values is generated for each component of a block of pixel values. Referring to FIG. 13, the entropy coding method 1300 receives a block of S number of sample values generated by the selected coding mode processing for each component of the current block of pixel values (1302). The entropy coding method 1300 forms entropy coding groups by distributing the sample values for each component in the block into two or more entropy coding groups (1304). The entropy coding method 1300 then converts the one or more sample values in each entropy coding group to a selected bit-based representation using CPEC (1306). For example, the entropy coding method 1300 may convert the first three groups using the sign-magnitude representation and convert the last group using the two's complement representation.

The method 1300 then determines, for each entropy coding group formed for each component, the bit-based representation being used for that group (1308). That is, the method 1300 selects one of the groups as the current group and determine the bit-based representation used for the current group.

In the case the current group is converted to the sign-magnitude representation, the method 1300 applies a first prefix codebook to encode the prefix value for the current group (1310). In the case the current group is converted to the two's complement representation, the method 1300 applies a second prefix codebook to encode the prefix value for the current group (1312). The first or second prefix codebook, or both, may contain separate prefix codebooks for different components of the pixel values. In that case, the method 1300 applies the appropriate prefix codebook associated with the specific component of the sample values in the selected first or second prefix cookbook to encode the prefix value.

The method 1300 then continues to the next entropy coding group of the current block (1314). The method 1300 selects the next group as the current group and repeats at 1308 to determine the bit-based representation being used and to apply the respective prefix codebook to encode the prefix value for the group.

With the prefix and the suffixes thus formed for each group, the entropy coding method packages the entropy coding groups and provides the set of entropy coding groups as output (1318). The method 1300 then selects the next block (1320). The method repeats at 1302 where the method 1300 receives the next block of sample values containing a block of S number of sample values for each component of the next block of pixel values.

Figure 14:
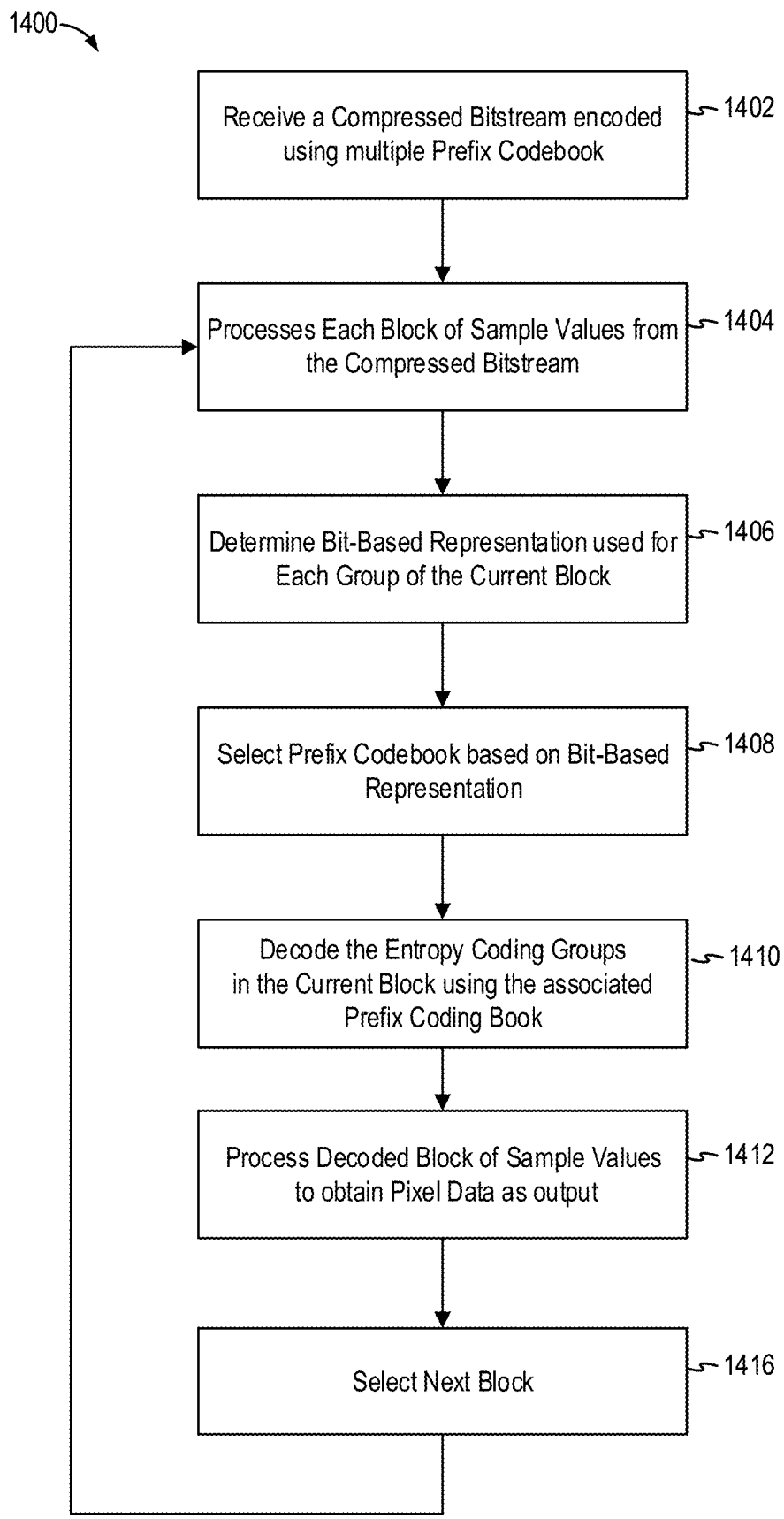
FIG. 14 is a flowchart illustrating a decoding method implemented in a display stream decoder in some embodiments.

Returning to FIG. 1, with the compressed bitstream thus formed by the display stream encoder 15, the compressed bitstream is transmitted over the display link 13 to the display driver integrated circuit 16. At the display driver integrated circuit 16, the display stream decoder 18 performs decoding of the compressed bitstream. In embodiments of the present disclosure, the display stream decoder is configured to implement the entropy coding method used by the encoder in order to decode the received compressed bitstream. FIG. 14 is a flowchart illustrating a decoding method implemented in a display stream decoder in some embodiments. Referring to FIG. 14, a decoding method 1400 receives a compressed bitstream (1402). The decoding method 1400 is configured to decode a compressed bitstream that has been encoded using the entropy coding method described above which employs multiple prefix codebooks.

The decoding method 1400 processes each block of sample values from the compressed bitstream (1404). For the current block of sample values being processed, the decoding method 1400 determines the bit-based representation used for each entropy coding group in the current block (1406). For example, the decoding method 1400 determines whether a particular entropy coding group is converted using the sign-magnitude representation or the two's complement representation.

Based on the determination of the bit-based representation used, the decoding method 1400 selects the appropriate prefix codebook for each entropy coding group in the current block (1408). Furthermore, in the case where the prefix codebook includes different prefix codebook for different components of the pixel value, the decoding method 1400 selects the prefix codebook for the component associated with the sample values.

With the prefix codebook determined, the decoding method 1400 proceeds to decode the current block using the determined prefix coding method (1410). In particular, the decoding method 1400 parses bits in the compressed bitstream to identify the prefix and the suffixes for each group. The decoding method 1400 decodes the prefix of each group using the selected prefix codebook. The decoding method 1400 decodes the sample values for each group. The decoded sample values for each group are used to construct the 8×2 block-wise sample values for each component. For example, the inverse of the grouping operations of FIG. 5 or 6 may be carried out to put the sample values of the entropy coding groups back into the 8×2 block-wise order. As a result, a block of 8×2 sample values for a component of the current block is obtained.

The decoding method 1400 then processes the 8×2 sample values to obtain the pixel values for the current block (1412). For example, the decoding method 1400 applies the inverse of the operation in FIG. 3 to obtain the block of pixel values from the block of sample values. The decoding method 1400 provide the pixel data as the video data output where the pixel data can be provided to the display for video playback, for example. The decoding method 1400 then selects the next block (1414) and the method repeats at 1404 where the selected block is processed.

The present disclosure can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided above along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

The above detailed descriptions are provided to illustrate specific embodiments of the present disclosure and are not intended to be limiting. Numerous modifications and variations within the scope of the present disclosure are possible. The present disclosure is defined by the appended claims.

What is claimed is:

1. A method of forming entropy coding groups in an entropy encoder, the method comprising:
   providing a plurality of prefix codebooks, each prefix codebook being associated with a bit-based representation;
   receiving a block of a first number of sample values generated by a selected coding mode processing as a current block of sample values;
   forming a plurality of entropy coding groups by distributing the first number of sample values into the plurality of entropy coding groups;
   converting the sample values in each entropy coding group to a selected bit-based representation;
   determining the bit-based representation used for each respective entropy coding group;
   in response to the determining that a respective entropy coding group is encoded using a first bit-based representation, selecting a first prefix codebook from the plurality of prefix codebooks;
   in response to the determining that the respective entropy coding group is encoded using a second bit-based representation, selecting a second prefix codebook from the plurality of prefix codebooks, the second prefix codebook being different from the first prefix codebook;
   applying the selected prefix codebook to encode a prefix value of the respective entropy coding group;
   forming the bit-representation of each respective entropy coding group, where the bit-representation of each respective entropy coding group comprises a prefix encoded using the selected prefix codebook and one or more sample values encoded in the selected bit-based representation; and
   providing the bit-representation of the plurality of entropy coding groups as an output.

2. The method of claim 1, wherein the first bit-based representation comprises a sign-magnitude bit-based representation and the second bit-based representation comprises a two's complement bit-based representation.

3. The method of claim 2, wherein providing the plurality of prefix codebooks comprises:
   providing the first prefix codebook associated with the sign-magnitude bit-based representation; and
   providing the second prefix codebook associated with the two's complement bit-based representation.

4. The method of claim 1, wherein converting the sample values in each entropy coding group to a bit-based representation comprises:
   converting the sample values in a first entropy coding group to the first bit-based representation and converting the sample values in a second entropy coding group to the second bit-based representation.

5. The method of claim 1, wherein providing the plurality of prefix codebooks comprises:
   providing the first prefix codebook and the second prefix codebook using a first coding scheme, the first prefix codebook having a first mapping of code words to prefix values and the second prefix codebook having a second mapping of code words to prefix values, the first mapping being different from the second mapping.

6. The method of claim 1, wherein providing the plurality of prefix codebooks comprises:
   providing the first prefix codebook using a first coding scheme and providing the second prefix codebook using a second coding scheme, the first coding scheme being different from the second coding scheme.

7. The method of claim 1, wherein the block of sample values is derived from a block of pixel values having a plurality of components, the block of sample values being associated with one component of the block of pixel values, and wherein providing the plurality of prefix codebooks comprises:
   providing the first prefix codebook including a plurality of component prefix codebooks, each of the component prefix codebooks being associated with a component of the pixel values.

8. The method of claim 7, wherein selecting a prefix codebook from the plurality of prefix codebooks for each respective entropy coding group in response to the determining comprises:

selecting a component prefix codebook from the plurality of component prefix codebooks of the first prefix codebook for a first entropy coding group in response to the determining that the first entropy coding group is encoded using the first bit-based representation and in response to the determining that the first entropy coding group is associated with a respective component of the pixel values.

9. The method of claim 1, wherein providing the plurality of prefix codebooks comprises:
providing a third prefix codebook using a third coding scheme and a third mapping of code words to prefix values, the third mapping of code words to prefix values comprising mapping of prefix values with decreasing probability of occurrence to codewords with increasing number of bit length.

10. The method of claim 1, wherein providing the plurality of prefix codebooks comprises:
providing a fourth prefix codebook using a fourth coding scheme and a fourth mapping of code words to prefix values, the fourth mapping of code words to prefix values comprising mapping a first group of prefix values to a first group of code words and mapping a second group of prefix values to a second group of code words, the first group of prefix values having higher probability of occurrence than that of the second group of prefix values, and the first group of code words having shorter number of bit length than that of the second group of code words.

11. A system for forming entropy coding groups in an entropy encoder, comprising:
a processor; and
a memory coupled with the processor, wherein the memory is configured to provide the processor with instructions which when executed cause the processor to:
provide a plurality of prefix codebooks, each prefix codebook being associated with a bit-based representation;
receive a block of a first number of sample values generated by a selected coding mode processing as a current block of sample values;
form a plurality of entropy coding groups by distributing the first number of sample values into the plurality of entropy coding groups;
convert the sample values in each entropy coding group to a selected bit-based representation;
determine the bit-based representation used for each respective entropy coding group;
in response to the determining that a respective entropy coding group is encoded using a first bit-based representation, select a first prefix codebook from the plurality of prefix codebooks;
in response to the determining that the respective entropy coding group is encoded using a second bit-based representation, select a second prefix codebook from the plurality of prefix codebooks, the second prefix codebook being different from the first prefix codebook;
apply the selected prefix codebook to encode a prefix value of the respective entropy coding group;
form the bit-representation of each respective entropy coding group, where the bit-representation of each respective entropy coding group comprises a prefix encoded using the selected prefix codebook and one or more sample values encoded in the selected bit-based representation; and
provide the bit-representation of the plurality of entropy coding groups as an output.

12. The system recited in claim 11, wherein the first bit-based representation comprises a sign-magnitude bit-based representation and the second bit-based representation comprises a two's complement bit-based representation.

13. The system recited in claim 12, wherein the memory is further configured to provide the processor with instructions which when executed cause the processor to:
provide the first prefix codebook associated with the sign-magnitude bit-based representation; and
provide the second prefix codebook associated with the two's complement bit-based representation.

14. The system recited in claim 11, wherein the memory is further configured to provide the processor with instructions which when executed cause the processor to:
convert the sample values in a first entropy coding group to the first bit-based representation and convert the sample values in a second entropy coding group to the second bit-based representation.

15. The system recited in claim 11, wherein the memory is further configured to provide the processor with instructions which when executed cause the processor to:
provide the first prefix codebook and the second prefix codebook using a first coding scheme, the first prefix codebook having a first mapping of code words to prefix values and the second prefix codebook having a second mapping of code words to prefix values, the first mapping being different from the second mapping.

16. The system recited in claim 11, wherein the memory is further configured to provide the processor with instructions which when executed cause the processor to:
provide the first prefix codebook using a first coding scheme and providing the second prefix codebook using a second coding scheme, the first coding scheme being different from the second coding scheme.

17. The system recited in claim 11, wherein the memory is further configured to provide the processor with instructions which when executed cause the processor to:
provide a third prefix codebook using a third coding scheme and a third mapping of code words to prefix values, the third mapping of code words to prefix values comprising mapping of prefix values with decreasing probability of occurrence to codewords with increasing number of bit length.

18. The system recited in claim 11, wherein the block of sample values is derived from a block of pixel values having a plurality of components, the block of sample values being associated with one component of the block of pixel values and the memory is further configured to provide the processor with instructions which when executed cause the processor to:
provide the first prefix codebook including a plurality of component prefix codebooks, each of the component prefix codebooks being associated with a component of the pixel values; and
select a component prefix codebook from the plurality of component prefix codebooks of the first prefix codebook for a first entropy coding group in response to the determining that the first entropy coding group is encoded using the first bit-based representation and in response to the determining that the first entropy coding group is associated with a respective component of the pixel values.

19. A method of decoding a compress bit stream, the method comprising:

receiving a compressed bitstream that has been encoded in an entropy encoder using a plurality of prefix codebooks to encode a prefix of each entropy coding group in the compressed bitstream;

processing a current block of samples values in the received compressed bitstream;

determining the bit-based representation used for each entropy coding group in the current block of sample values;

selecting a prefix codebook from the plurality of prefix codebooks based on the determined bit-based representation;

decoding the current block using the selected prefix codebook; and generating sample values for each component of the current block as an output.

20. The method of claim 19, wherein the plurality of prefix codebooks comprise a first prefix codebook associated with a sign-magnitude bit-based representation and a second prefix codebook associated with a two's complement bit-based representation.

\* \* \* \* \*